Sept. 1, 1942.　　　　J. W. DAWSON　　　　2,294,388
RESISTANCE WELDING SYSTEM
Filed Jan. 2, 1940　　　　2 Sheets-Sheet 2

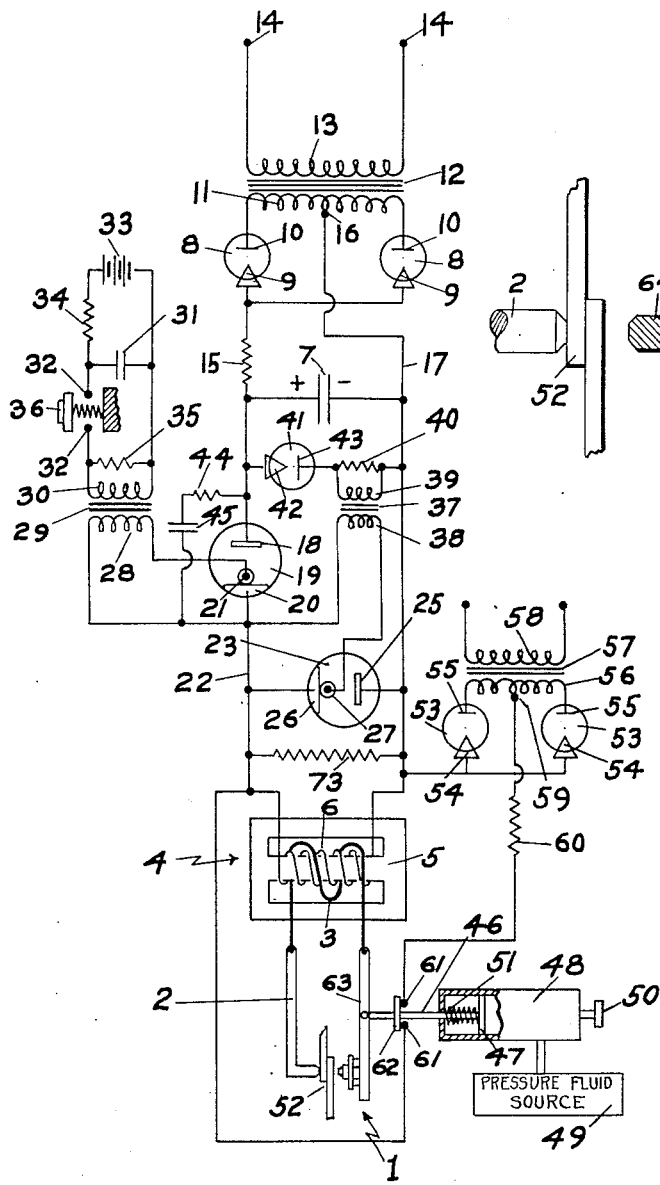
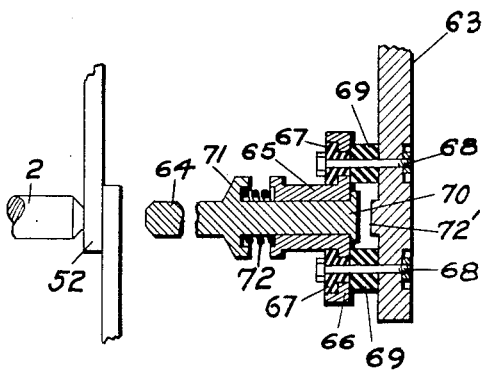
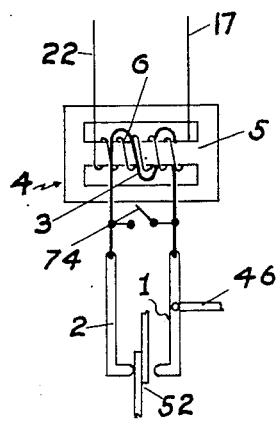
Fig. 1.
Fig. 2.
Fig. 3.
INVENTOR.
JOHN W. DAWSON,
BY Elmer J. Gorn
ATTY.

INVENTOR.
JOHN W. DAWSON,
BY Elmer J. Gorn
ATTY

Patented Sept. 1, 1942

2,294,388

UNITED STATES PATENT OFFICE 2,294,388

RESISTANCE WELDING SYSTEM

John W. Dawson, Auburndale, Mass., assignor to Raytheon Manufacturing Company, Newton, Mass., a corporation of Delaware Application January 2, 1940, Serial No. 312,019

13 Claims. (Cl. 171—119)

This invention relates to resistance welding systems in which the welding load is supplied with current through a transformer having a magnetic core, and in which a pulse of current is supplied to the primary of the transformer for each weld. In such systems, particularly where each pulse of current supplied to the primary winding has a considerable direct current component, the problem of saturation of the transformer core becomes particularly troublesome. Such substantially unidirectional pulses of current, however, are advantageous in resistance welding and can conveniently be secured in connection with welding by a condenser discharge, as described and claimed in my copending application, Serial No. 309,124, filed December 14, 1939, on Condenser welding systems.

One of the objects of this invention is to provide an arrangement whereby between welds direct current is supplied to the transformer to reset the residual flux in the transformer core to zero, or preferably to a value opposite that of said residual flux.

Another object is to deliver said direct current from various types of supply, such as a direct current source continuously or intermittently connected to the transformer, or from an energy storage system such as a condenser.

Another object is to utilize the retentivity of the transformer core to retain the flux as reset by the direct current.

A further object is to arrange such a system in which provisions are made for preventing the energization of the welding electrodes until after they have engaged the work, and to deenergize said welding electrodes before they disengage the work in order to insure a complete absence of sparking at the work.

The foregoing and other objects of this invention will be best understood from the following description of exemplifications thereof, reference being had to the accompanying drawings, wherein:

Fig. 1 is a diagram of a resistance welding system embodying my invention;

Fig. 2 is an enlarged cross-section through one of the welding electrodes shown in Fig. 1;

Fig. 3 is a fragmentary diagram showing a modification of Fig. 1;

Figure 5:
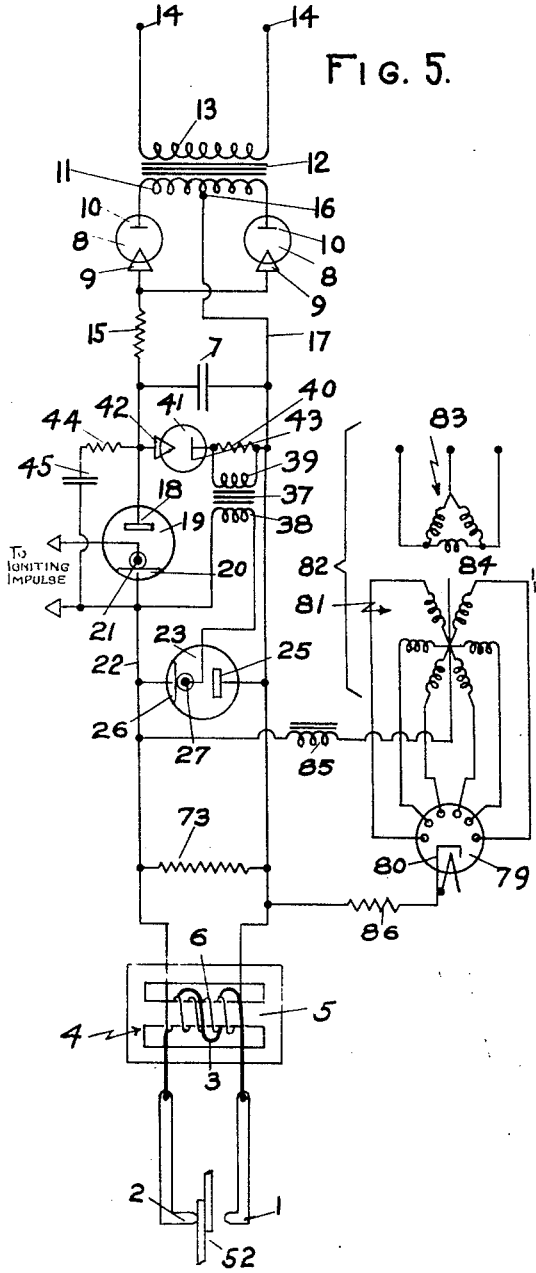
Fig. 5 is a diagram illustrating another modification in which the direct current for resetting the flux is continuously connected to the transformer.

In the arrangement shown in Fig. 1, welding current is to be supplied to a pair of welding electrodes 1—2 from the secondary winding 3 of a welding transformer 4. This welding transformer is provided with a core member 5 made of magnetic material which preferably has a relatively high degree of retentivity. The welding transformer 4 is also provided with a primary winding 6 adapted to be energized by the discharge from a relatively large condenser 7. This condenser is adapted to be charged from any suitable source of direct current, such as direct current generator, battery, rectifier, or the like. In Fig. 1 the direct current is shown as being supplied from a pair of rectifier tubes 8. These tubes may be of the gas or vapor-filled type having permanently energized cathodes 9. These cathodes may be thermionic filaments or any other suitable type of cathode. The rectifier tubes 8 are provided with anodes 10 which are connected to opposite sides of the secondary winding 11 of a charging transformer 12. This charging transformer is provided with a primary winding 13 connected at terminals 14 to a suitable source of alternating current.

The two cathodes 9—9 are connected together through an impedance 15 to one side of the condenser 7. The secondary winding 11 is provided with a center tap 16 which is connected through a conductor 17 to the other side of said condenser 7. The impedance 15, which may be a resistance, is of a value to maintain the proper charging rate for the condenser 7.

The side of the condenser 7 which is connected to the cathodes 9 is also connected directly to the anode 18 of a controlled ignition discharge tube 19. This tube is preferably of the pool cathode type with an igniter for initiating a cathode spot on the pool in order to cause the tube to conduct current. Although any suitable type of igniter may be used, it preferably is of the type described and claimed in the copending application of Percy L. Spencer, Serial No. 303,963, filed November 13, 1939, for an improvement in Arc igniting devices, consisting of a conductor separated and insulated from the cathode by a thin glass layer. The tube 19 is provided with a pool cathode 20, preferably of mercury, and an igniter 21, preferably of the type as explained above. The cathode 20 is connected directly to one side of the primary winding 6 by means of a conductor 22. The other side of said primary winding is connected to the conductor 17, and thus to the other side of the condenser 7.

Connected between the conductors 17 and 22 and thus directly across the primary winding 6 is a tube 23 also preferably of the same type as tube 19. Tube 23, therefore, has an anode 25, a pool type cathode 26, and an igniter 27. As indicated in connection with the tube 19, this igniter may be of any convenient type, but is preferably of the electrostatic type described more fully in connection with said tube 19. The cathode 26 is connected to the conductor 22 while the anode 25 is connected to the conductor 17.

The tube 19 is normally non-conducting, and thus the condenser 7 retains its charge until the tube 19 is ignited. The igniter 21 is supplied with igniting impulses from the secondary winding 28 of an igniting transformer 29. This transformer is provided with a primary winding 30 which is supplied with igniting current impulses from a condenser 31. One side of this condenser is connected to one side of the primary winding 30, while the other side is connected through a pair of normally open contacts 32 to the other side of said primary winding. The condenser 31 is adapted to be charged with direct current from a suitable source, such as a battery 33, connected across the condenser 31 through a current-limiting resistance 34. A resistance 35 is also preferably connected across the primary winding 30. The contacts 32 are adapted to be closed by any suitable control means, such as a pushbutton switch 36.

The tube 23 which likewise is normally non-conducting is ignited at the proper time from an igniting transformer 37 having a secondary winding 38 connected between the igniter 27 and its cathode 26. The igniting transformer 37 also has a primary winding 39 connected across a resistance 40 which is connected in series with a rectifying tube 41 across the condenser 7. The rectifying tube 41 may be of small current-carrying capacity and preferably is one which can satisfactorily withstand the voltage applied to the condenser 7. The rectifier tube 41 is provided with a permanently energized cathode 42 connected to the positive side of the direct current supply for the condenser 7. This is the side which is connected to the cathodes 9. The tube 41 also is provided with an anode 43 connected through the resistance 40 to the negative conductor 17. In this way the voltage across the tube 41 is the voltage on the condenser 7. Since the condenser 7 is charged from rectifiers 8 so that the left-hand side thereof is positive and the right-hand side negative, the tube 41 ordinarily does not conduct current. In order to assist the tube 19 in starting, a resistance 44 in series with the condenser 45 is connected across said tube.

The welding electrode 2 is usually stationary while the conductor 1 is movable toward and away from the stationary electrode. This motion may be produced by a thrust rod 46 connected to the electrode 1. The thrust rod is also connected to a piston 47 within a pressure gun 48 adapted to be supplied with pressure fluid from a suitable source 49. The supply of pressure fluid to the piston 47 may be controlled by some suitable control member 50 which when depressed will admit the pressure fluid to the face of the piston 47, thus forcing the thrust rod 46 and consequently the electrode 1 toward the electrode 2. The piston 47 is normally biased by a spring 51 to open the electrodes 1 and 2.

When the system is energized, the condensers 7 and 31 acquire a charge as previously described. The operating member 50 may then be depressed so as to close the electrodes 1 and 2 upon a piece of work 52 which is to be welded. Thereupon the pushbutton 36 is depressed and the condenser 31 discharges through the primary winding 30 supplying an igniting impulse to the igniter 21. This causes the tube 19 to start conducting current, and thus the condenser 7 discharges through said tube 19 to supply a pulse of welding current to the primary winding 6, and thus to the welding electrodes 1 and 2. This discharge of condenser 7 causes the voltage across it to fall to zero when substantially a maximum of discharge current is flowing from said condenser. Thereupon the voltage across the condenser 7 tends to reverse and the current tends to continue to flow in the same direction due to the inductance of the various parts of the system to which the condenser 7 is connected. As the voltage across the condenser 7 reverses, the tube 41 will start to conduct current and a short pulse of current will flow through the resistance 40, setting up a voltage which is supplied to the primary winding 39. This causes an igniting impulse to be supplied through the secondary winding 38 to the igniter 37. Thereupon the tube 23 becomes ignited and the current instead of flowing through the condenser 7 flows through the tube 23. As described and claimed in my co-pending application referred to above, this causes substantially an exponential decay of the current in the welding load, and likewise makes the current flowing in the primary winding 6 substantially unidirectional for each welding impulse.

When the tube 23 is ignited, tube 19 is extinguished, and cannot thereafter restart until another igniting impulse is supplied thereto. At this time, therefore, the condenser 7 is effectively disconnected from the welding circuit, and immediately starts to recharge from the direct current supplied by the rectifiers 8, inasmuch as this charging circuit is permanently connected to the condenser 7. The magnitude of the impedance 15 is such that during the period of conduction of the tube 19, the rectifiers 8 are not called upon to supply any excessive amount of current. Since the recharging of the condenser 7 can start immediately upon its voltage first dropping to zero, the system can be operated at maximum speed since said recharging occurs while welding current is still flowing in the welding load. The above arrangement, therefore, is particularly adaptable for use where relatively high speeds of welding are desired. Of course it is to be understood that the actuation of the control members 50 and 36 may be automatically controlled so as to control timing and speed of welding.

In the operation described above a substantially unidirectional pulse of current is supplied to the primary winding 6 for each weld. Since as explained above the core member 5 has a relatively high degree of retentivity, the core would normally be left with a relatively high value of flux in it at the end of each weld. Subsequent welding operations would tend to increase this flux so that the core would soon become saturated. In accordance with my invention, I have provided means for resetting this flux between welds. For this purpose a suitable source of direct current is furnished. This may, for example, consist of a pair of rectifier tubes 53, each provided with a cathode 54 and an anode 55. The anodes 55 may be connected to opposite sides of a secondary winding 56, the transformer 57 having a primary 58 connected to a suitable source of alternating current. The cathodes 54 are connected together at the right-hand side of the primary winding 6. The secondary winding 56 is provided with a center tap 59 which is connected through current-limiting resistance 60, and a pair of contacts 61 to the left-hand side of the primary winding 6. The contacts 61 are adapted to be closed by an armature 62 carried by the thrust rod 46. The armature 62 is so arranged that the contacts 61 are closed in the open position of the electrode 1.

Upon the completion of a weld, the control member 50 is released so as to remove the pressure from the piston 47 and permit the spring 51 to retract the thrust rod 46 and thus move the electrode 1 to its open position. When this occurs the armature 62 will close the contacts 61 and cause the rectifier tubes 53 to supply direct current to the primary winding 6. It will be noted that the polarity of this direct current is so chosen that it flows through the primary winding 6 in the opposite direction to that of the previous pulse of discharge current from the condenser 7. In this way the residual flux in the core member 5 is eliminated, and any tendency for subsequent welding operations to saturate said core is prevented. Although resetting the residual flux in the core member 5 to a zero value will result in the elimination of any tendency for saturation to occur, I prefer that the direct current supplied from the rectifiers 53 shall be of a sufficient value to set up a flux in the core member 5 of opposite direction to the residual flux. By such an arrangement a greater effi-efficiency of utilization of the core material can be obtained, and thus the transformer 4 can be made with a much smaller core. This advantage increases with the value of the reverse flux until such reverse flux at the beginning of the succeeding weld is substantially equal to the maximum flux in the opposite direction during an actual welding operation. Prior to the making of the subsequent weld, the electrode 1 will again be moved toward the electrode 2, and thus the armature 62 will open the contact 61. Therefore, at the beginning of the subsequent weld, the direct current from the rectifiers 53 will not be flowing through the primary winding 6. However, by selecting the core member 5 of material which has a relatively high degree of retentivity, in practice a reverse flux of the order of 25 per cent. of the maximum forward flux may be obtained.

In the arrangement as described above, some tendency for flux changes in the transformer 4 may exist upon the movement of the electrodes 1 and 2 toward the closed position, and also at the time when said electrodes move so as to release the work. Under these conditions, sparking may tend to occur at the work upon the closing and opening of the electrodes 1 and 2. Such sparking might produce defects in the surface of the work which are undesirable. In order to avoid any such possibility, the welding electrode 1 is preferably constructed as shown more clearly in Fig. 2, so that the welding circuit is disconnected from the secondary winding 3 at the moment the electrodes 1 and 2 contact the work and also at the moment when said electrodes release the work. The electrode 1 is constructed with an elongated arm 63 carrying the welding point 64 at its outer end. The welding point 64 is slidably mounted in a sleeve 65 rigidly carried by but insulated from the arm 63. For this purpose the sleeve 65 may be provided with a flange 66 carrying insulating bushings 67 through which pass bolts 68. Surrounding the bolts 68 and interposed between the flange 66 and the arms 63 are spacing insulators 69. The bolts 68 are provided with nuts at opposite ends thereof to clamp the spacing insulators 69 between the flange 66 and the arms 63. In this way the sleeve 65 is rigidly supported by the arms 63 but is effectively insulated therefrom. The welding point 64 is provided with a head 70 which abuts against one end of the sleeve 65, so as to prevent the welding point from pulling out of said sleeve. In order to bias the welding point 64 to its outer position, it is provided with an annular member 71 and a compression spring 72 interposed between said annular member 71 and the outer end of the sleeve 65. The arm 63 is provided with a contact portion 72' opposite the head 70 on the welding point 64. In the open position of the welding electrode 1, the spring 72 maintains the welding point 64 in its outer position, and thus the head 70 is maintained spaced from the contact portion 72'. Therefore, under these conditions the welding point 64 is electrically insulated from the arm 63, and thus the welding circuit is broken at the head 70 and the contact portion 72'. As the thrust arm 46 moves the welding electrode into contact with the work 52, the welding point 64 and the electrode 2 will first engage the work 52, while the welding circuit is still broken. Therefore, any voltages which might exist across the secondary winding 3 cannot produce any sparking at the work 52. It is only after the spring 72 has been compressed and thus after the work 52 is under a similar pressure that the head 70 comes into contact with the contact portion 72' to complete the welding circuit for the secondary winding 3. After completion of a weld, the thrust arm 46 moved by the spring 51 withdraws the electrode 1 from the work 52. However, the welding point 64 remains in contact with the work 52 until after the circuit has been broken by the heads 70, leaving the contact member 72'. Thus any sparking which might tend to occur, due to residual voltages appearing in the secondary winding 3, will occur between the head 70 and the contact 72' rather than at the work 52.

In order to prevent the appearance of any excessive voltages across the primary winding 5, upon opening of the secondary circuit a resistance 73 may be connected across the primary winding 6.

Instead of preventing voltages from being applied to the welding work 52 at the instant of engagement and disengagement by the welding electrodes, by opening the circuit as discussed above in connection with Fig. 2, a similar result can be obtained by the arrangement as shown schematically in Fig. 3. In this arrangement a switch 74 is connected directly across the electrodes 1 and 2. This switch 74 is operated so as to be closed before the welding electrodes 1 and 2 engage the work 52, and is opened immediately after said engagement. The switch 74 is also closed immediately before the electrodes 1 and 2 disengage the work 52, and may then be opened after said disengagement takes place. Although the switch 74 could be maintained closed throughout the period between welds, it is desirable that it be opened immediately after the disengagement of the work 52, and closed immediately prior to said engagement in order that the rectifiers 53 during the resetting of the flux need not supply energy to the closed circuit afforded by the closure of the switch 74.

Of course it is to be understood that the sequence of operation of the switch 74 as well as the sequence of operation of the members 50 and 36 can be controlled by standard automatic timing means.

Figure 4:
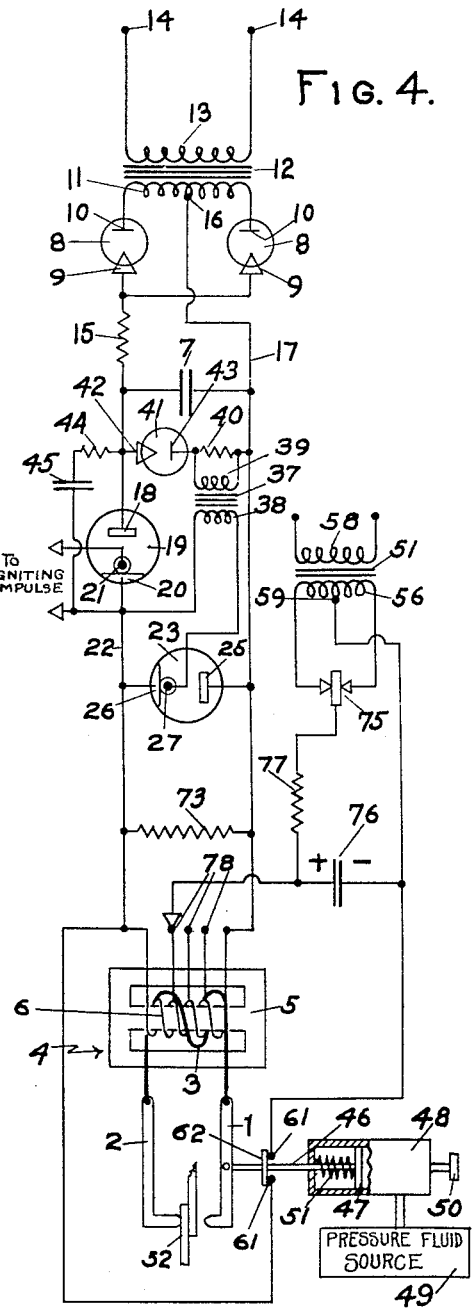
Fig. 4 is a diagram illustrating a modified form of the arrangement shown in Fig. 1, in which a condenser discharge is used to reset the flux.

As previously indicated, the direct current for resetting the flux of the core member 5 may be supplied from any suitable source. For example, a charged condenser may be used to accomplish such resetting as shown in Fig. 4. In this figure the same reference numerals are applied where elements are identical with those shown in Fig. 1. However, in Fig. 4 instead of the rectifier tubes 53 of Fig. 1, a relatively small full-wave rectifier 75 which may be of the copper-oxide type may be used. This rectifier is used to charge a condenser 76 through a current-limiting resistance 77. Instead of connecting the positive side of the condenser 76 directly to one side of the primary winding 6, said primary winding may be provided with a plurality of taps 78 to which such connection may be made. The negative side of the condenser 76 is connected as in Fig. 1 through the contacts 61 to the other side of the primary winding 6.

When the control member 50 is operated to close the welding electrodes 1 and 2, the contacts 61 are opened and the rectifier 75 starts to charge the condenser 76. The constants of the circuit are so chosen that during the making of the weld, the condenser 76 acquires a desired predetermined charge. After the weld is completed and the electrode 1 moved to its open position, the contacts 61 are closed by the armature 62, and the condenser 76 then will discharge through the primary winding 6. The constants of the condenser 76 as related to the inductance and resistance of the primary winding 6 are so chosen that critical damping of the discharge current or substantially critical damping occurs. Thus the discharge from the condenser 76 through the primary winding 6 occurs as a substantially unidirectional pulse of current. In order that some adjustment of these constants may be had, the taps 78 are provided on the primary winding 6. By properly selecting the size of the condenser 76 and the charge which is supplied to it, the value of the resetting current supplied to the primary winding 6 may be any predetermined amount to secure the resired results. As previously indicated, the residual flux may be reset to zero, but preferably such resetting produces a reverse flux of substantial value. Since the discharge from the condenser 76 is of relatively short duration, it is desirable that the core member 5 likewise be made of a material having a relatively high degree of retentivity so that the reverse reset flux may be retained in said core member so as to be available at the beginning of the subsequent welding operation. Since it is contemplated that the condenser 76 itself shall supply substantially all of the resetting current, the size of the rectifier 76 and of the resistance 77 is so chosen that the rectifier 75 is not called upon to supply any substantial amount of current to the primary winding 6.

Instead of supplying the direct current for flux resetting purposes only between welds the direct current source could be connected across the primary winding permanently as shown, for example, by the modification of Fig. 5. In this figure likewise identical reference numerals are applied to elements which are identical with those represented in Fig. 1. In Fig. 5 the direct current resetting sources of Figs. 1 and 4 are replaced by a suitable source of direct current permanently connected across the primary winding. It is desirable that this source shall supply comparatively smooth direct current in order to avoid generation of spark-producing voltages during the engagement and disengagement of the welding electrodes with the work. Such a source of direct current could be obtained as shown in Fig. 5 from a multiphase rectifier tube 79, as shown in Fig. 5. This tube could be of the gas or vapor-filled type having six anodes and a thermionic cathode 80 which could be of the indirectly-heated thermionic type. The six anodes of the tube 79 are connected to a six-phase secondary winding 81 of a transformer 82 having a three-phase primary winding 83 connected to some suitable source of three-phase alternating current. The secondary winding 81 is provided with a neutral point 84 which is connected through a choke 85 to the left-hand side of the primary winding 6 of the welding transformer 4. The cathode 80 is connected through a current-limiting resistance 86 to the right-hand end of the primary winding 6.

When the tube 19 is fired, as explained in connection with Fig. 1, a tendency exists for some of the discharge current from the condenser 7 to flow through the rectifier tube 79. However, since this discharge current has a relatively steep wave front, the choke coil 85 effectively prevents any substantial amount of this current from passing from the rectifier tube 79 and thus by-passing the primary winding 6. Furthermore, any ripple which may appear in the output of the rectifier tube 79 will produce a ripple voltage drop across the choke coil 85 and to this extent reduce any corresponding ripple voltage across the primary winding 6. As previously indicated, such a ripple voltage might be undesired because of a tendency to produce sparking at the work upon engagement and disengagement by the welding electrodes. The resistance 86 performs substantially the same function as the resistance 60 in Fig. 1. As explained in connection with Figs. 1 and 4, the flux in core 5 may be reset either to zero or to a substantial reverse value. Since the direct current is supplied continuously to the arrangement in Fig. 5, it is not necessary for the core 5 to retain the reset flux for any period of time. Therefore, the core 5 need not be of relatively high retentivity material, as described in connection with Figs. 1 and 4. However, such material could be used without disadvantageous effect from the standpoint of increasing the residual flux inasmuch as any such residual flux will be effectively reset as explained above.

Of course it is to be understood that this invention is not limited to the particular details as described above as many equivalents will suggest themselves to those skilled in the art. For example, the various arrangements for resetting the residual flux in the welding transformers could be applied to various welding systems in which this problem exists, and need not necessarily be confined to the condenser welding systems illustrated herein. Also flux resetting magnetomotive force need not be applied directly to the primary welding transformer inasmuch as other means of supplying such a magnetomotive force, as for example by a separate winding, could be devised. Likewise the various sources of direct current shown for resetting the flux are merely illustrative, and various other types of direct current sources could be utilized. Various other modifications and ideas as to the utilization of the principles enunciated herein will suggest themselves to those skilled in the art. It is accordingly desired that the appended claims be given a broad interpretation commensurate with the scope of the invention within this art.

What is claimed is:

1. A system comprising a transformer having a magnetic core and windings provided with input and output connections, a circuit connected to the output of said transformer, means for supplying to the input to said transformer a pulse of current having a substantial direct current component for individual operations, and means for continuously impressing on said core a magnetomotive force having a substantial unidirectional component opposite in direction to the magnetomotive force exerted on said core by said first-mentioned direct current component.

2. A system comprising a transformer having a magnetic core provided with primary and secondary windings, a circuit connected to said secmary winding a pulse of current having a substantial direct current component for individual operations, and means for continuously supplying to said primary windings a current having a substantial direct current component flowing through said primary winding in the opposite direction to that of said first-mentioned direct current component.

3. A system comprising a transformer having a magnetic core and windings provided with input and output connections, a circuit connected to the output of said transformer, means for supplying to the input to said transformer a pulse of current having a substantial direct current component for individual operations, a supply of substantially constant direct current, means for continuously impressing said direct current supply on said transformer, the polarity of said direct current supply being such as to supply to said core a magnetomotive force opposite in direction to the magnetomotive force exerted on said core by said direct current component.

4. A system comprising a transformer having a magnetic core and windings provided with input and output connections, a circuit connected to the output of said transformer, means for supplying to the input to said transformer a pulse of current having a substantial direct current component for individual operations, a supply of substantially constant direct current continuously connected to said transformer, the polarity of said direct current supply being such as to supply to said core a magnetomotive force opposite in direction to the magnetomotive force exerted on said core by said direct current component.

5. A system comprising a transformer having a magnetic core provided with primary and secondary windings, a circuit connected to said secondary winding, means for supplying to said primary winding a pulse of current having a substantial direct current component for individual operations, a supply of direct current connected to said primary winding during the time said pulse of current is flowing, the polarity of said direct current supply being such as to supply to said core a magnetomotive force opposite in direction to the magnetomotive force exerted on said core by said direct current component, and means for substantially preventing said pulse of current from passing through said direct current supply.

6. A system comprising a transformer having a magnetic core provided with primary and secondary windings, a circuit connected to said secondary winding, means for supplying to said primary winding a pulse of current having a substantial direct current component for individual operations, a supply of direct current connected to said primary winding during the time said pulse of current is flowing, the polarity of said direct current supply being such as to supply to said core a magnetomotive force opposite in direction to the magnetomotive force exerted on said core by said direct current component, and inductance means for substantially preventing said pulse of current from passing through said direct current supply.

7. A system comprising a transformer having a magnetic core and windings provided with input and output connections, a circuit connected to the output of said transformer, means for supplying to the input to said transformer a pulse of current having a substantial direct current component for individual operations, condenser means, means for charging said condenser means, and means for establishing a discharge circuit for said condenser means through said transformer between operations, said discharge circuit being adapted to cause said discharge to have a substantial direct current component, the polarity of charge on said condenser means being such as to supply to said core a magnetomotive force to create in said core a flux opposite in direction to the flux in said core during the pulse of current.

8. The method of operating a system comprising a transformer having a magnetic core and windings provided with input and output connections, and a circuit connected to the output of said transformer, which comprises supplying to the input to said transformer a pulse of current having a substantial direct current component for individual operations, and continuously impressing on said core a magnetomotive force having a substantial unidirectional component opposite in direction to the magnetomotive force exerted on said core by said first-mentioned direct current component.

9. A system comprising a transformer having a magnetic core and windings provided with input and output connections, means for supplying to the input to said transformer a pulse of current having a substantial direct current component for individual operations, whereby a flux is set up in said core in a certain direction, and means for impressing on said core between operations a magnetomotive force having a substantial unidirectional component opposite in direction to the magnetomotive force exerted on said core by the first-mentioned direct current component, said magnetomotive forces being of such relative values that the flux which exists in said core at the end of an operation is opposite in direction to the flux which exists in said core at the beginning of said operation.

10. A system comprising a transformer having a magnetic core and windings provided with input and output connections, said core comprising a material having a relatively high magnetic retentivity, means for supplying to the input to said transformer a pulse of current having a substantial direct current component for individual operations, whereby a flux is set up in said core in a certain direction, and means for impressing on said core between operations a magnetomotive force having a substantial unidirectional component opposite in direction to the magnetomotive force exerted on said core by the first mentioned direct current component, said magnetomotive forces being of such relative values and said magnetic retentivity being of sufficient magnitude to create in said core at the beginning of each operation a substantial flux opposite in direction to the flux which exists in said core at the end of the operation.

11. A system comprising a transformer having a magnetic core and windings provided with input and output connections, means for supplying to the input to said transformer a pulse of current having a substantial direct current component for individual operations, whereby a flux is set up in said core in a certain direction, and means for impressing on said core between operations a magnetomotive force having a substantial unidirectional component opposite in direction to the magnetomotive force exerted on said core by the first-mentioned direct current component, said magnetomotive forces being of such relative values that the flux which exists in said core at the end of an operation is substantially equal and opposite in direction to the flux which exists in said core at the beginning of said operation.

12. A system comprising a transformer having a magnetic core and windings provided with input and output connections, means for supplying to the input to said transformer a pulse of current having a substantial direct current component for individual operations, whereby a flux is set up in said core in a certain direction, and means for impressing on said core between operations a magnetomotive force having a substantial unidirectional component opposite in direction to the magnetomotive force exerted on said core by the first-mentioned direct current component, said magnetomotive forces being of such relative values that the flux which exists in said core at the beginning of an operation is opposite in direction to and of the order of 25 per cent or more of the flux which exists in said core at the end of the operation.

13. A system comprising a transformer having a magnetic core provided with primary and secondary windings, a circuit connected to said secondary winding, means for supplying to said primary winding a pulse of current having a substantial direct current component for individual operations, a supply of direct current connected to said primary winding during the time said pulse of current is flowing, the polarity of said direct current supply being such as to supply to said core a magnetomotive force opposite in direction to the magnetomotive force exerted on said core by said direct current component, and impedance means for substantially preventing said pulse of current from passing through said direct current supply.

JOHN W. DAWSON.

CERTIFICATE OF CORRECTION.

Patent No. 2,294,388.　　　　　　　　　　　　　September 1, 1942.

JOHN W. DAWSON.

It is hereby certified that error appears in the printed specification of the above numbered patent requiring correction as follows: Page 5, first column, lines 24 and 25, claim 2, for the syllables "sec-" and "mary" read --secondary winding, means for supplying to said primary--; and that the said Letters Patent should be read with this correction therein that the same may conform to the record of the case in the Patent Office.

Signed and sealed this 6th day of October, A. D. 1942.

(Seal)

Henry Van Arsdale,
Acting Commissioner of Patents.